(12) United States Patent
Mow

(10) Patent No.: US 6,795,540 B1
(45) Date of Patent: Sep. 21, 2004

(54) PREMISED BASED 3-WAY CALL DETECTION DEVICE

(76) Inventor: John Beck Mow, 4665 Glen Heather Dr., Frisco, TX (US) 75034

(*) Notice: Subject to any disclaimer, the term of this patent is extended or adjusted under 35 U.S.C. 154(b) by 0 days.

(21) Appl. No.: 10/250,156

(22) Filed: Jun. 9, 2003

(51) Int. Cl.[7] .............................. H04M 3/00; H04M 3/42
(52) U.S. Cl. .................. 379/188; 379/189; 379/201.01; 379/207.1
(58) Field of Search ........................... 379/207.01, 188, 379/201.01

(56) References Cited

U.S. PATENT DOCUMENTS

| | | |
|---|---|---|
| 4,935,956 A | 6/1990 | Hellwarth |
| 5,539,812 A | 7/1996 | Kitchin |
| 5,768,355 A | 6/1998 | Salibrici |
| 5,805,685 A | 9/1998 | McFarlen |
| 5,883,945 A | 3/1999 | Richardson |
| 6,141,406 A | 10/2000 | Johnson |
| 6,560,323 B2 | 5/2003 | Gainsboro |
| 6,587,553 B1 * | 7/2003 | Shaffer et al. ............... 379/188 |
| 6,611,583 B1 * | 8/2003 | Gainsboro .................. 379/188 |
| 2003/0091181 A1 | 5/2003 | Martin |

* cited by examiner

*Primary Examiner*—Ahmad F. Matar
*Assistant Examiner*—Hector Agdeppa

(57) ABSTRACT

Disclosure of the invention encompasses the activation, validation and continued verification of an electronic device installed on a common telephone line usually at a residence, to prohibit a three-way call event from being performed by the local telephone after the device has been in communication with and activated by signal from a remote computer system.

Furthermore the device and remote system can function in a prepaid calling mode keeping track of the prepaid amounts and debiting the amounts during the call. The invention functionality could also be integrated within a standard telephone inside a telephone housing or functionally into a wireless device or an IP soft phone.

9 Claims, 3 Drawing Sheets

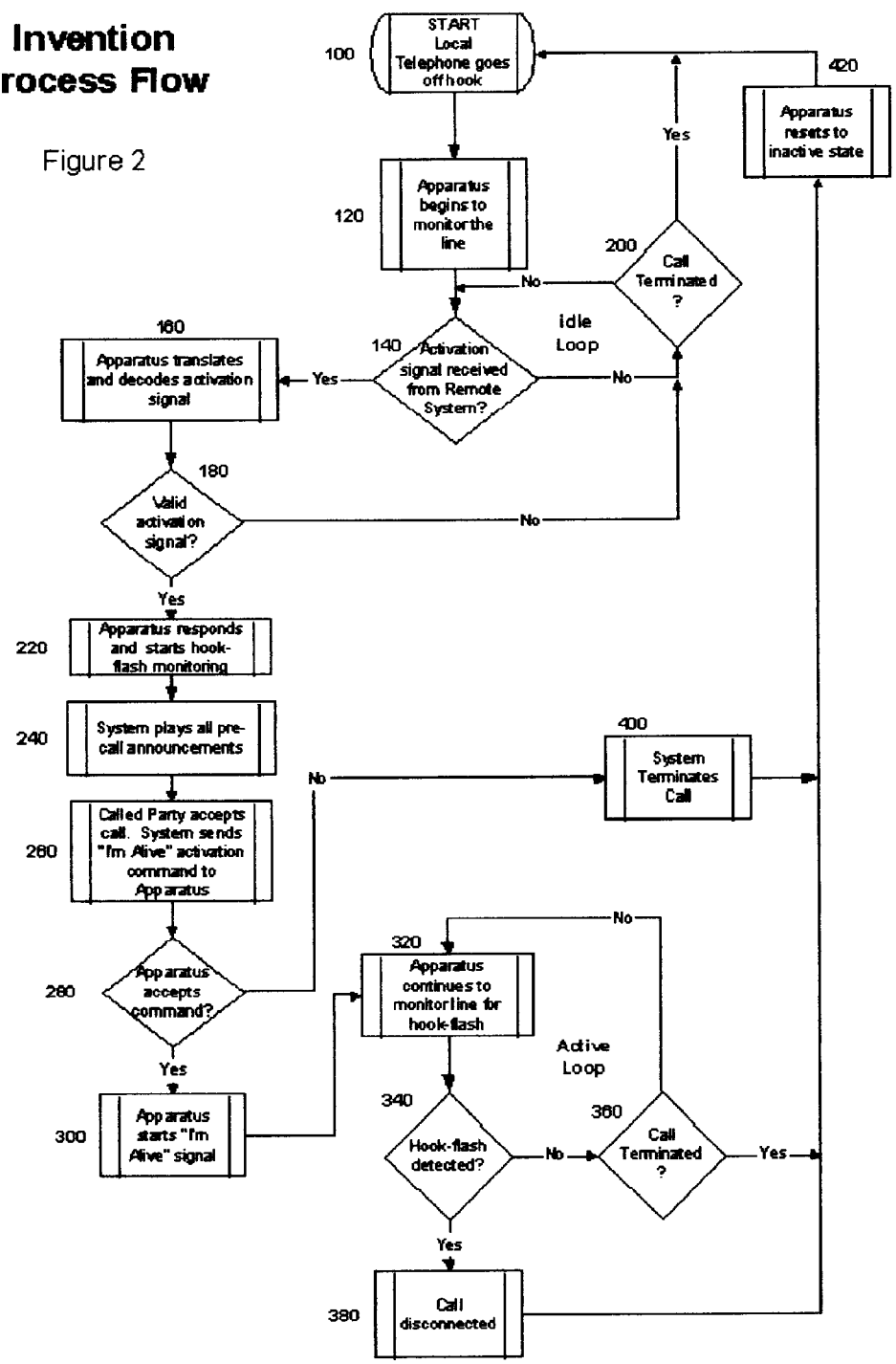

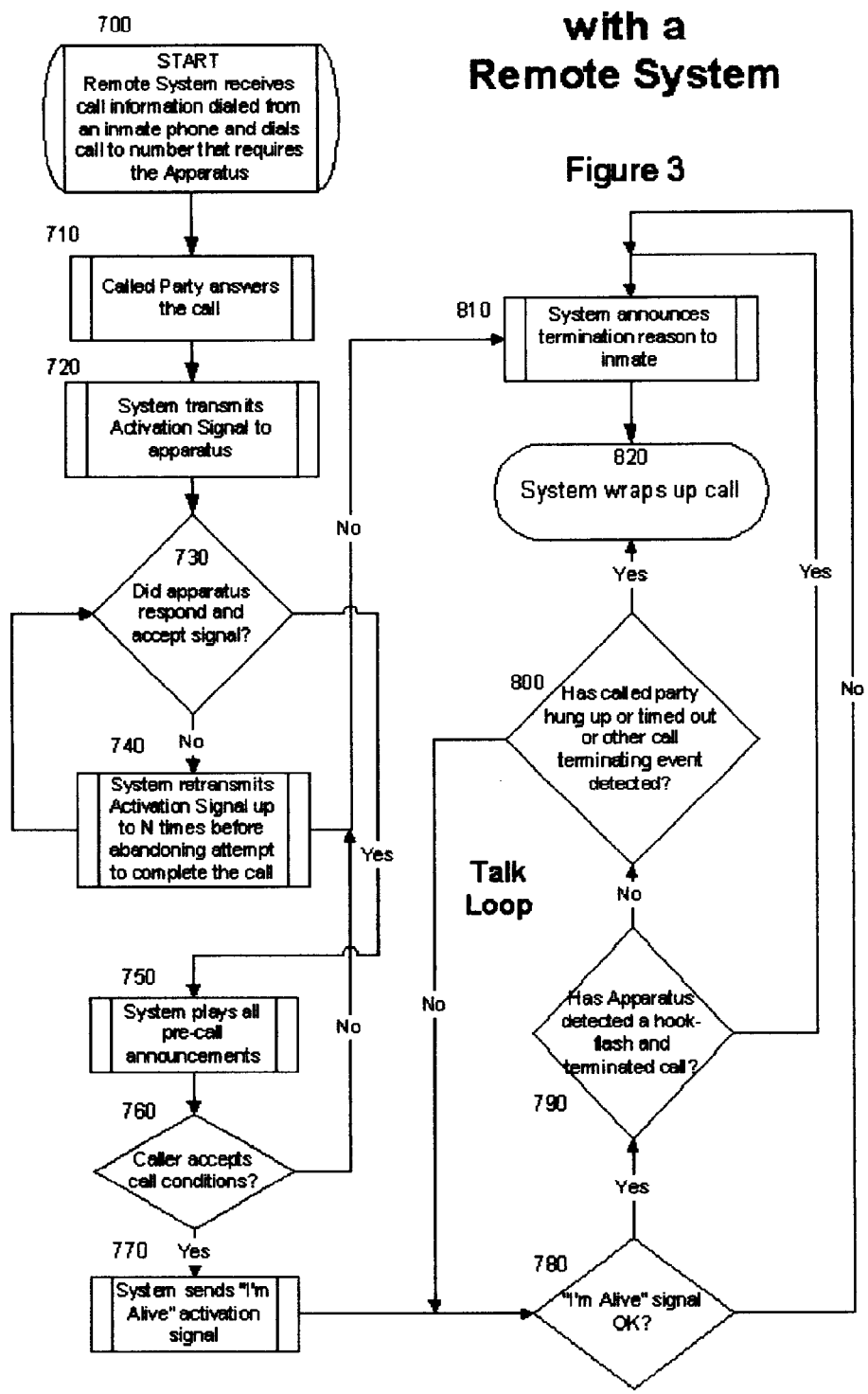

PREMISED BASED 3-WAY CALL DETECTION DEVICE

BACKGROUND OF INVENTION

Today when inmates in prisons make collect calls or prepaid calls to friends and families through a computer controlled inmate telephone system (ITS), U.S. Pat. Nos. 6,560,323 and 4,935,956, these calls can be relayed to other parties that inmates are forbidden to call, such as overseas, cell phones, payphones, conferences with other inmates in another prison, their crime partners on the outside and known criminal and terrorist elements. Some prison ITS implement "allowed call lists" that have 10–20 numbers that inmates are permitted to call and that have been approved by the institution. Many prisons do not utilize these lists because of the administrative hassle involved in the approval and ongoing maintenance support.

It is a common industry estimate that 10% of all calls from prisons are 3-way call attempts. A 3-way call is a feature found on most home telephones implemented by depressing the switch hook for about a half second, which sends an electrical wink signal to the serving telephone company central office telling it that a feature is being requested. The inmate is placed on hold while another dial tone is returned to the telephone user who can then dial any location in the world. During the ringing or after the dialed party answers, another depression of the switch hook for about a half second, conferences the 3 parties together. Similarly, if the called party is already in conversation with another party, when the inmate call arrives, the local central office notifies the called party of a call waiting. To answer the call waiting event, a hook-flash is performed on the line. To join all the parties together another hook-flash is performed.

It has been proven that many of these calls are crime related. Many recordings of inmate calls from prisons have been taken to court to help prosecute the inmate for old or new crimes. While prisons may have investigators that monitor and listen to some percentage of calls, it is virtually impossible to monitor all calls with the quantity of prison officials on duty. Therefore, while some criminal inmate calls may be caught, the vast majority of them are not. Citizens suffer the brunt of continued criminal activities conducted over prison phones. Crimes are committed, witnesses harassed, girlfriends and boyfriends harassed, etc.

While virtually every inmate telephone system (ITS) has some form of 3-way call detection feature, real studies have shown that at best, these detection features might be only 30–40% effective contrasted to the 80–90% effectiveness purported by some phone system providers. Some percentage of ITS don't have 3-way detection because of the age of the ITS or fear of patent lawsuits that are prevalent in the industry. A common occurrence of some ITS systems is that false triggers are generated from normal conversational sounds and from the high background noises of prisons. These false triggers cause lots of complaints from inmates and their families that prisons and providers don't like to handle. Therefore the feature may be turned off.

Furthermore, inmates know how to defeat the current 3-way detection feature by making loud noises such as coughing, singing, and tapping on the mouthpiece with their fingernails while the feature is being invoked. One system has a "humming" problem that easily jams its 3-way detection scheme. They are the world's greatest "phone freaks" and constantly find ways to circumvent controls. Thus the real 3-way call detection percentage is very low.

All of the 3-way patents currently issued rely upon some form of analyzing the audio portion, approximately 300–4000 hertz bandwidth, of the common telephone line that a prison phone call is conducted over by converting the analog signal to a digital domain and performing some algorithm in the digital domain—U.S. Pat. Nos. 5,883,945 5,805,685 5,539,812 5,738,655. Although there may be a unique analog signature caused by the hook-flash event, any other sounds can jam this event if the detector is at the prison site, masking that signature making it indistinguishable. And it is common knowledge inside prisons that they can make noises which prevent the detection of a 3-way call attempt.

There are patents on analyzing the transmission characteristics of a line during the call to determine if they changed significantly enough to determine that a 3rd party was added to the call —U.S. Pat. No 6,141,406. Because the added party may be next door, across town or around the world, setting the thresholds to make a decision can be challenging. Contrast a legal 3rd party addition to having several people at the called party's location pick up extension phones creating a legal multi-party conversation. These phones may have different terminating impedances depending upon if they are portable, cheap, old or new and can constantly pickup or hang up during the call.

The invention does not analyze the audio portion of the telephone line for 3-way detection. Its advantage is that it is installed at the called party location and can electrically detect a 3-way call attempt by measuring the loss of current for about a half second from the telephone instrument. No inmate noise can prohibit the apparatus from detecting this event. The reliability of detecting the 3-way attempt should therefore be extremely high.

If multiple extension phones are picked up in parallel with the invention phone, electrically, none of the instruments can activate a 3-way event, not even the phone connected to the invention. If the invention phone line is temporarily placed on-hook while one remaining phone performs a 3-way connection, the activation and "I'm alive" signal methodology in conjunction with the remote system will detect this event and terminate the call.

While every allowed called party of an inmate who may be required to use the invention, has to have it installed, the invention will be relatively low priced and easy to install. The motivation behind the invention is to prevent continued criminal calls from occurring from prisons, not to make it easy and economical from the prison or service provider perspective. Today's 3-way call attempt methodologies, for the most part, are unreliable. There are no known released studies that show the statistics of these methodologies. Furthermore, many inmate telephone systems have been installed for 3–6 years and cannot or will not be upgraded to the latest software or hardware releases that may be available for them because of the costs involved. Economics dictates how incarcerated criminal's communications are controlled, not law enforcement principals.

The U.S. Inspector General performed a study of the Federal Bureau of Prison system in 1999. Some comments were: http://www.usdoj.gov/oig/bopcalls/execsum.htm website.

"... he talked on the telephone "all day long" and made arrangements for drug deals on the telephone almost every day, including participating in conference calls to Colombia . . . "

"This special review conducted by the Office of the Inspector General (OIG) found that a significant number of federal inmates use prison telephones to commit serious crimes while incarcerated including murder, drug trafficking, and fraud."

"Our interviews, case examinations, data collection, and document review paint a troubling picture of the scope and seriousness of inmate use of prison telephones to engage in criminal activity.

"One FBI head said "he believed that when large scale drug dealers serve time . . . all you do is change his address and his phone number" by putting him in prison. He stated that drug dealers can conduct business as usual and may even feel a bit more secure behind bars than they do on the street.

With 2,000,000 inmates in about 5,000 U.S. prisons making over 500,000,000 calls a year, 50,000,000 of these calls may be 3-way attempts. This is an incredible quantity of calls that are placed illegally. Even if half are detected and prevented, tens of millions of calls that are not prevented create a lot of uncontrolled crime in this country.

The purpose of the invention is to provide a more secure method of preventing these illegal calls. Not every called party requires an invention to be used because not every inmate is a threat. But with drug and violent criminals comprising about 70% of the inmates nationwide, a disturbing factor is that the recidivism (repeat offender) rate is over 70% for these criminals. This means that 70% will get caught again and go right back to prison, and if the invention can prevent more crimes from being conducted from within prisons, the inconvenience of the distribution of them will be overcome with the high reliability factor of preventing the 3-way criminal calls, hopefully lowering the recidivism rate and protecting our citizens moreover.

SUMMARY OF INVENTION

The invention is a small electronic unit that connects between a telephone instrument and a common analog telephone line normally at a residence. Whenever the telephone is off-hook, the invention monitors the telephone line for an activation signal from the remote inmate telephone computer system. When it receives this signal, it begins monitoring for a hook-flash event generated by the local telephone that is an indication of a feature event requested from the local telephone exchange, which is an illegal event for inmate calls.

After the call is accepted by the called party, the unit is commanded to begin emitting a "I'm alive" signal, that constantly identifies that it is active to the inmate telephone system. The loss of the "I'm alive" signal for a short period will trigger a disconnection by the remote system. If a hook-flash is detected during the call, the unit can notify the remote system or disconnect the call or both.

BRIEF DESCRIPTION OF DRAWINGS

FIG. 2 is the Invention Process Flow embodying the principles of the invention.

FIG. 3 is an Example Process Flow with a Remote System showing the interaction from the system's perspective with the invention

DETAILED DESCRIPTION

Figure 1:
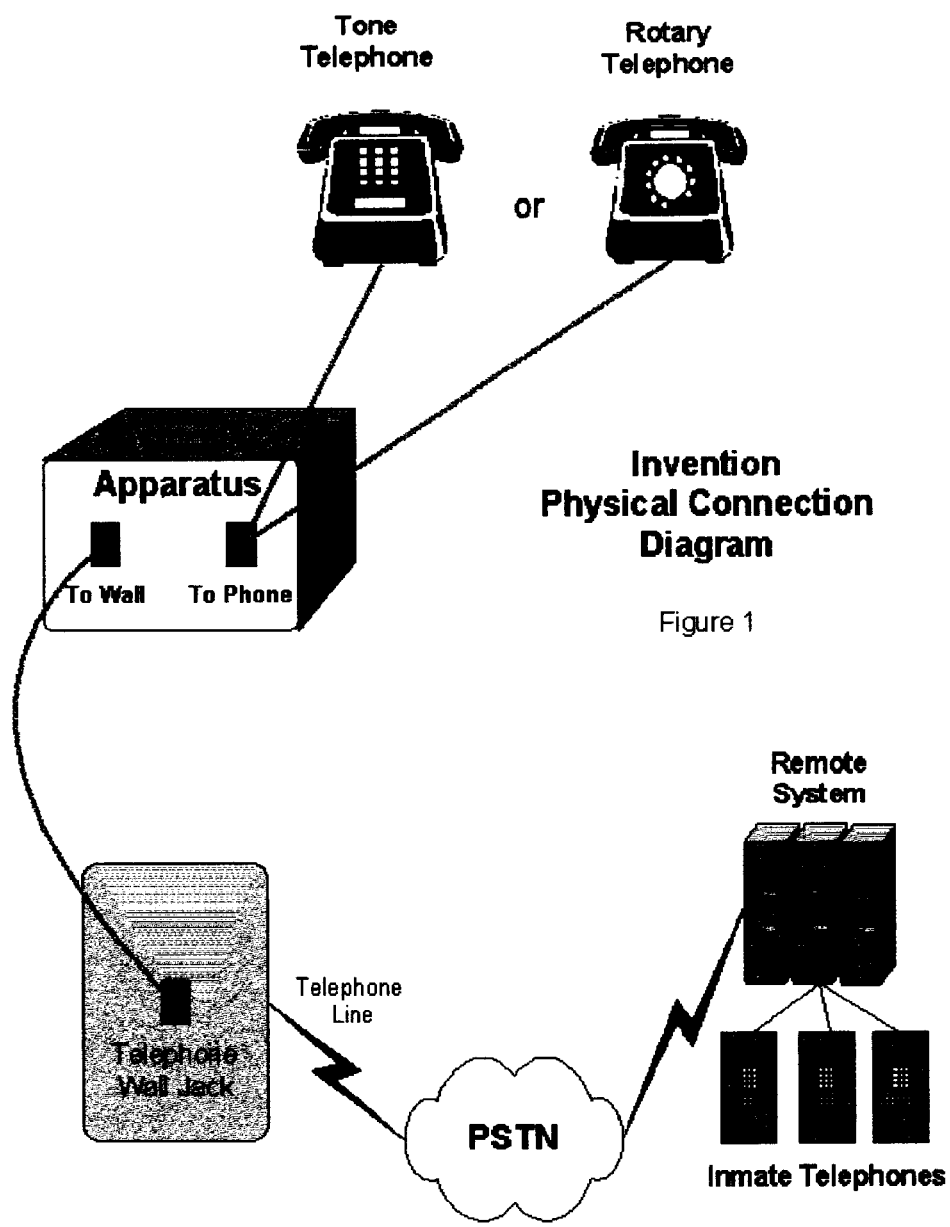
FIG. 1 is the Invention Physical Connection Diagram

FIG. 2—Invention Process Flow The apparatus is in an idle state until the telephone goes off hook 100 on either an answered or originated call. It begins to monitor 120 the telephone line in the audio bandwidth for the activation signal from the remote system. A 4th column DTMF digit may be the activation signal because they are not found on normal telephone sets and will be easily recognized with a high degree of reliability. The activation signal 140 is transmitted as soon as the remote system detects an answer from the called party telephone.

The apparatus receives and decodes 160 the activation signal. If invalid, it may be transmitted again N times until accepted. If it is not accepted, the call is terminated 200 because the remote system rules require the apparatus presence to complete the call.

If the activation signal is accepted 220, the apparatus starts the hook-flash monitoring while the system plays all of the pre-call announcements 240 required by prisons. A hook-flash is performed by a momentary on-hook/off-hook event from the telephone which lasts approximately 0.25 to 0.75 seconds in duration. Pre-announcements can last up to a minute or more. If the called party wants to initiate a 3-way call during this period, the hook-flash detection is turned on and will not allow it. If the called party picks up another telephone extension, hangs up the apparatus extension, completes a 3-way call from the other extension, activates the conferencing of the 3 parties, the call will be terminated when the system tries to activate the "I'm alive" signal. If the apparatus line is picked up and the other extension hangs up leaving the conference in progress, the apparatus will not recognize the "I'm alive" command because it has been reset by the on-hook condition and requires the initial activation signal 140 as a precursor. The remote system should withhold any transmission from the inmate to be connected to the line, as it does during the pre-call announcement segment, until the "I'm alive "signal is accomplished.

Once the "I'm alive" command is received 260 and accepted, 280, the signal commences 300. There can be many variations of the "I'm alive" signal to prevent a recording from being made and used on another extension line at the called location. The remote system may command a change periodically for security purposes also. The apparatus continues to monitor the line for a hook-flash condition 320 and remains in the Active Loop 320-340-360 until the call is terminated. If the hook-flash is detected 340 the call is disconnected 380 and the apparatus is reset to an inactive state 420.

FIG. 3—Example Process Flow with a Remote System The interaction with an inmate telephone system would comprise a process flow like the following: Once the remote system receives and validates all of the call information from the inmate 700, the call is dialed. The called party receives the call and answers 710. Upon answer detection, the system transmits an activation signal 720, i.e. a 4th column A DTMF signal for example, to the apparatus. The apparatus responds that it accepted the command 730. If not, the system may reattempt the linkup N times before terminating the call and explaining the reason 810 to the inmate. An option here would be to also explain the reason to the called party before termination 820.

Once the activation of the apparatus occurs, 750, all of the paella announcements are played and the called party accepts the call usually by dialing a certain digit 760. Then the system sends the "I'm alive" activation command 770 to the apparatus and begins receiving that signal 780. If not received 810 an announcement is made to the inmate and the call is terminated 820. If the "I'm alive" signal is received 780, the Talk Loop 780, 790, 800 is followed until the called party hangs up, the system is timed out or a hook-flash 790 is detected or a loss of the "I'm alive"signal 780 occurs. In all cases the system wraps up the call with its normal processes.

What I claim is:

1. A method of preventing a 3-way call from a telephone instrument on a local analog telephone line, normally at a residence, with an apparatus that is connected between the telephone instrument and the local analog telephone line, wherein the local analog telephone line is connected to a remote computer system, said method including the steps of:

using the apparatus to passively monitor all telephone calls on the local analog telephone line for an activation signal from the remote computer system;

activating the apparatus during a telephone call upon responding to the activation signal from the remote computer system;

starting a 3-way call detection feature on the local analog telephone line;

periodically transmitting, from the apparatus, an "I'm alive" continuity signal over the local analog telephone line to the remote computer system; and terminating the telephone call, with the apparatus, when a 3-way call is detected on the local analog telephone line.

2. The method of claim 1 wherein if the remote computer system stops receiving the "I'm alive" continuity signal for a preset interval of time, the telephone call is disconnected.

3. The method of claim 1 wherein one method of detecting the 3-way call is by a hook-flash event wherein loss of line current is measured for a predetermined period of time.

4. The method of claim 1 wherein one type of an activation response is a formulated identification response to the activation signal.

5. The method of claim 1 wherein another type of an activation response is a table lookup response to the activation signal.

6. The method of claim 2 wherein one example of the "I'm alive" continuity signal is a response made up of tone pairs of frequencies which make up standard DTMF or MF frequencies.

7. The method of claim 1 further including a step of using the apparatus and the remote computer system to function interactively together in a plurality of modes, with one mode being a prepaid calling mode wherein a prepaid amount is decremented every preset interval of time during a call until a maximum call length is reached or until the prepaid amount decrements to zero, whereby in either case, the call is terminated, using at least one or some combination of the amounts, with the timing and the controls being maintained in the apparatus.

8. The method of claim 1 further including a step of integrating the apparatus with the electronics of the telephone instrument inside the telephone instrument housing.

9. The method of claim 1 further including the step of including functionality of the apparatus in a portable wireless telephone device or including functionality of the apparatus in an IP soft phone which has a means for, after being activated during a call, detecting if a 3-way conference or equivalent feature is invoked, and terminating the call in such an event.

* * * * *